(12) United States Patent
Yuksel et al.

(10) Patent No.: US 12,166,662 B2
(45) Date of Patent: Dec. 10, 2024

(54) SYSTEM AND METHOD FOR DISTANCE VECTOR ROUTING IN PARTITIONED NETWORKS

(71) Applicant: University of Central Florida Research Foundation, Inc., Orlando, FL (US)

(72) Inventors: Murat Yuksel, Orlando, FL (US); Ammar Farooq, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/312,975

(22) Filed: May 5, 2023

(65) Prior Publication Data
US 2024/0195727 A1  Jun. 13, 2024

Related U.S. Application Data

(60) Provisional application No. 63/359,516, filed on Jul. 8, 2022.

(51) Int. Cl.
  *H04L 45/12* (2022.01)
  *H04L 45/00* (2022.01)
  *H04L 45/28* (2022.01)

(52) U.S. Cl.
  CPC ............ *H04L 45/123* (2013.01); *H04L 45/22* (2013.01); *H04L 45/28* (2013.01)

(58) Field of Classification Search
  None
  See application file for complete search history.

(56) References Cited

U.S. PATENT DOCUMENTS

| | | | | |
|---|---|---|---|---|
| 5,881,243 A | * | 3/1999 | Zaumen | H04L 45/00 709/239 |
| 6,667,957 B1 | * | 12/2003 | Corson | H04L 45/124 370/254 |
| 6,678,242 B1 | * | 1/2004 | Simon | H04Q 11/0478 370/218 |
| 7,096,251 B2 | * | 8/2006 | Chiu | H04L 45/44 709/202 |
| 7,961,626 B2 | * | 6/2011 | Reeve | H04L 45/00 370/235 |
| 2002/0013856 A1 | * | 1/2002 | Garcia-Luna-Aceves | H04W 40/02 709/230 |

(Continued)

OTHER PUBLICATIONS

C. Perkins et al. "Ad hoc On-Demand Distance Vector (AODV) Routing" Jul. 2003. pp. 1-37, RFC 3561.AODV Routing.

(Continued)

*Primary Examiner* — Ranodhi Serrao
(74) *Attorney, Agent, or Firm* — Molly L. Sauter; Smith & Hopen, P.A.

(57) ABSTRACT

A system and method for disconnection tolerant network routing, termed Binary State Distance Vector Routing (BSDVR). BSDVR provides for unicast routing on partitioned networks by introducing binary state information for distance vector (DV) entries to compute unicast paths. In the presence of network partitions, BSDVR effectively avoids the count-to-infinity problem and operates with control overhead less than traditional DV routing by an order of magnitude, leading to much better convergence times for failures.

20 Claims, 14 Drawing Sheets

(56) References Cited

U.S. PATENT DOCUMENTS

| | | | |
|---|---|---|---|
| 2002/0049561 A1* | 4/2002 | Garcia-Luna-Aceves | H04L 45/54 702/182 |
| 2007/0070909 A1* | 3/2007 | Reeve | H04L 45/50 370/238 |
| 2008/0089235 A1* | 4/2008 | Kotrla | H04L 43/16 370/242 |
| 2010/0172237 A1* | 7/2010 | Savage | H04L 45/28 370/228 |
| 2016/0269275 A1* | 9/2016 | Garcia-Luna-Aceves | H04W 40/246 |
| 2020/0052997 A1* | 2/2020 | Ramanathan | H04L 47/286 |

OTHER PUBLICATIONS

T. Clausen et al. "RFC 7181: The Optimized Link State Routing Protocol Version 2" Apr. 2014, pp. 1-115. RFC 7181.Standards Track.

J. Chroboczek et al. "The Babel Routing Protocol" Jan. 2021, pp. 1-54. Standards Track, Internet Engineering Task Force (IETF).

J.J. Garcia Lunes Aceves et al. "Loop-Free Routing Using Diffusing Computations" 1993 pp. 130-141. vol. 1, No. 1 IEEE/ACM Transactions on Networking.

D. Savage et al. "Cisco's Enhanced Interior Gateway Routing Protocol (EIGRP)" May 2016, pp. 1-80. RFC 7868.

* cited by examiner

SYSTEM AND METHOD FOR DISTANCE VECTOR ROUTING IN PARTITIONED NETWORKS

CROSS REFERENCE TO RELATED APPLICATIONS

This invention claims priority to U.S. Provisional Patent Application No. 63/359,516, filed on Jul. 8, 2022 and entitled, "System and Method for Distance Vector Routing in Partitioned Networks", the entirety of which is incorporated by reference.

FEDERALLY SPONSORED RESEARCH OR DEVELOPMENT

This invention was made with government support under Award No. 70NANB17H188 awarded by the National Institute of Standards and Technology. The government has certain rights in the invention.

BACKGROUND OF THE INVENTION

Delay/Disconnection Tolerant Networks (DTNs), as a form of ad-hoc networks, have a vast array of applications where sustainable network infrastructure may be absent, e.g., communication among first responder teams during a disaster, or communication within isolated units in battlefield. Disconnections, or long end-to-end delays, are the norm in such environments and the network typically forms in an ad-hoc opportunistic fashion. Such ad-hoc DTNs are highly dynamic and require specialized routing protocols that operate under resource constraints and can handle frequent disconnections or link failures. Traditionally, two different families of routing protocols operate in such disconnected environments, namely epidemic routing and distance vector (DV) routing.

Epidemic routing protocols involve probabilistic exchange of data messages among nodes to increase the delivery rate. Their key advantage is a minimal control state (e.g., no or partial forwarding tables) but they have a costly data plane as every data message may be copied many times during the forwarding process. These copies cause extra load on the network capacity that can become prohibitive in limited-resource networks such as first responders' network during a disaster. To avoid forwarding multiple copies of the data messages, DV routing requires that the nodes maintain a localized view to their direct neighbors where routes get retrieved on-demand using the Bellman-Ford algorithm to calculate the shortest paths, with little reliance on periodic advertisements, which reduces the overall bandwidth demand, therefore, making it suitable for highly dynamic networks. However, DV routing requires the underlying network to be connected. To handle disconnections, that may result in partitions, most DV-based routing protocols employ on-demand reactive mechanisms involving a signaling phase before transmission of data messages (e.g., Ad Hoc On-Demand Distance Vector (AODV)) or additional state in packet headers (e.g., Destination Sequenced Distance Vector (DSDV)). Without such extra cost, DV routing cannot avoid the well-known count-to-infinity problem when it is faced with the problem of finding a unicast path between nodes located in different partitions of a network.

However, in view of the art considered as a whole at the time the present invention was made, it was not obvious to those of ordinary skill in the field of this invention how a DV routing technique could be implemented that avoids the count-to-infinity problem in a network that has become partitioned.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

In various embodiments, the present invention provides a novel approach, termed Binary State Distance Vector Routing (BSDVR), that can provide unicast routing on partitioned networks. BSDVR introduces binary state information for distance vector (DV) entries to compute unicast paths, even if the network is partitioned.

In one embodiment of BSDVR, a method for disconnection tolerant routing in a network is provided. The method includes, establishing a network comprising a plurality of nodes, wherein each of the plurality of nodes comprises a distance vector (DV) routing table comprising a plurality of DV entries and wherein one of the plurality of DV entries indicates the primary path toward a destination and wherein the primary path is the shortest routing path to the destination. The method further includes assigning binary state information to each of the plurality of distance vector (DV) entries, wherein the binary state information indicates an active or inactive state of a routing path associated with the respective DV entry. Additionally, when one of the nodes of the plurality of nodes realizes that the primary path toward a destination has experienced a failure, the method further includes erasing the DV entries in the DV routing table of the node for the destination that has experienced the failure and sending an inactive DV update to neighboring nodes in the network and each of the neighboring nodes in the network replying to the inactive DV update by sending its active DV entry for the destination that has experienced the failure to its neighboring nodes.

In a particular embodiment, when a new active DV entry is received at one of the plurality of nodes having a current inactive DV entry for the same destination, the method includes selecting the new active DV entry if the cost associated with the routing path is below infinity. Alternatively, when a new inactive DV entry is received at one of the plurality of nodes having a current active DV entry for the same destination and the cost of the routing path for the current active DV entry is infinity, the method includes selecting the new inactive DV entry. However, when the cost of the routing path for the current active DV entry is not infinity and the new inactive DV entry is on the primary path, the method includes selecting the new inactive entry and erase alternative DV entries and when the cost of the routing path for the current active DV entry is not infinity and the new inactive DV entry is not on the primary path, the method includes selecting the new inactive DV entry.

The present invention further provides a method for storing one or more data packets in a message buffer of a node, wherein each of the one or more data packets is assigned a state selected from not-forwarded, inactive-forwarded and active-forwarded. Additionally, when the message buffer is full, the method provides for removing data packets from the message buffer in the order of active-forwarded, inactive-forwarded and not-forwarded.

In an additional embodiment, a system is provided for performing disconnection tolerant routing. The system includes a plurality of nodes connected in a network, wherein each of the plurality of nodes comprises a distance vector (DV) routing table comprising a plurality of DV entries, wherein one of the plurality of DV entries indicates the primary path toward a destination and wherein the primary path is the shortest routing path to the destination and wherein binary state information is assigned to each of the plurality of DV entries and wherein the binary state information indicates an active or inactive state of a routing path associated with the respective DV entry. Each of the plurality of nodes in the network are configured to realize when the primary path toward a destination has experienced a failure, erase the DV entries in the DV routing table for the destination that has experienced the failure and send an inactive DV update to neighboring nodes in the network and when the inactive DV update is received, reply to the inactive DV update by sending its active DV entry for the destination that has experienced the failure to its neighboring nodes.

The nodes of the network are further configured to handle conflicting active and inactive DV entries and to perform message handling for not-forwarded, inactive-forwarded and active-forwarded data packets.

The present invention provides, a system and method for disconnection tolerant network routing, termed Binary State Distance Vector Routing (BSDVR). BSDVR provides for unicast routing on partitioned networks by introducing binary state information for distance vector (DV) entries to compute unicast paths. In the presence of network partitions, BSDVR effectively avoids the count-to-infinity problem and operates with control overhead less than traditional DV routing by an order of magnitude, leading to much better convergence times for failures.

DETAILED DESCRIPTION OF THE INVENTION

Figure 1:
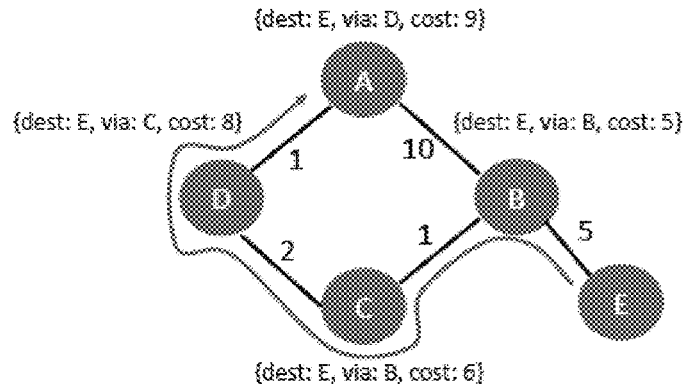
FIG. 1 illustrates a converged Traditional Distance Vector Routing (TDVR) network, as is known in the art.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention. The invention accordingly comprises the features of construction, combination of elements, and arrangement of parts that will be exemplified in the disclosure set forth hereinafter and the scope of the invention will be indicated in the claims.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Routing of data packets plays a crucial role in computer networks. Routers are required to calculate which way to forward an incoming data packet. This calculation is done via routing protocols, which essentially determine how the routers will exchange reachability information with each other so that they can calculate the paths the data packets should be taking. This route calculation process mostly aims to find the shortest-paths for the data packets traveling towards their destinations. Legacy routing protocols assume that the underlying network is connected, i.e., no router is isolated from the other routers on the network. However, due to failures, some routers do get disconnected, and the network become partitioned. This partitioning of the network leaves the other routers, (i.e., the routers in each partition) confused and, typically, requires them to recompute the paths towards the routers in the other partition. During this recomputation, distance-vector routing protocols (which is one class of routing protocols that routers use to exchange distance information among each other) are known to fall into the trap of creating temporary loops in the paths, which are resolved after many iterations of control message exchanges, a.k.a., the count-to-infinity problem.

Due to the difficulty of handling partitions when calculating end-to-end shortest paths, Delay/Disconnection Tolerant Networks (DTN) routing literature has focused on using epidemic forwarding methods where data messages are probabilistically sent to neighbors with the hope of increasing their delivery rate. These routing protocols aim to develop the most optimal forwarding strategy because overall performance in terms of its delivery rate and packet loss is greatly affected by how well the next relay node gets selected and an optimal data dissemination policy which determines the number of copies allowed for a message so that its delivery likelihood is maximized.

DTN routing protocols can be classified into two broad categories, pure opportunistic and social-based, based on the forwarding strategies they employ. The social-based approach selects relay node based on social group information obtained from historical encounters to build multi-level social groups. The pure opportunistic uses the same mobility patterns and interaction history to assign a probability to relay nodes for delivering a message. Only nodes with high delivery probability are then selected to forward a message, which reduces the overall copies of the message in the network. While the opportunistic DTN routing protocols employ multiple copies of data messages to cope with possible partitions in the network, the Binary State Distance Vector Routing (BSDVR) protocol in accordance with the present invention, in contrast, aims to deliver a single copy of every data message, i.e., unicast delivery, even if the network is partitioned. This is believed to be the first time a DTN routing protocol can achieve unicast forwarding of data messages over a partitioned network.

The BSDVR protocol in accordance with the present invention is designed to obtain a better tradeoff between control and data plane overheads in a dynamic network where partitions are prevalent. Traditional approach to DTN routing has been to use epidemic routing. In BSDVR, the key novelty is to achieve nearly unicast forwarding by using an enhanced version of the legacy DV routing design for control plane and optionally allowing conventional epidemic methods in the data plane. BSDVR assigns each link with a cost based on metrics such as geo-distance, capacity, or loss rate.

In the control plane, BSDVR includes additional state information in its DV table (DVT) entries. Each node can have either active or inactive DV entries, allowing them to preserve information about past connections along with the currently active connections. Active DV entries are those that comprise of present paths that are still active. Conversely, inactive DV entries are made up of paths that were active at some point in the past but have become inactive. Both types of entries are used in constructing the forwarding table for the data plane. Given these binary state DVs, one can carefully integrate the active and inactive states when DV updates are being exchanged. These binary states on paths provide nodes with more information in making data dissemination decisions. This binary separation allows BSDVR to detect link failures on the 'shortest path first (SPF) tree' used to install the paths in the forwarding table entries, and hence to treat connected paths separately than the failed or disconnected ones.

For the data plane, the binary state information of paths also gets used to create additional states for disseminating data packets stored in the message buffer of nodes. The data packets in the message buffer of a node can have three possible states: not-forwarded, inactive-forwarded and active-forwarded. Not-forwarded packets have not yet been forwarded to any of the other encountered nodes, e.g., because they did not have any path to the packet's destination. Inactive-forwarded packets are those that have passed onto a relay node that has an inactive path to the destination. Finally, active-forwarded packets are those that either got passed to their destination node directly or to a relay node that has an active path to the destination. Once a packet becomes active-forwarded by a node it never gets forwarded again. When the message buffer is full and old packets are removed in the order of active-forwarded, inactive-forwarded, and not-forwarded. This increases the packets' delivery likelihood. In contrast to traditional epidemic routing, BSDVR can attain more controlled and informed flooding of the data packets by using these three states.

In traditional DV routing (TDVR) based on Bellman-Ford's algorithm, it is not possible to entirely avoid the count-to-infinity since the nodes downstream to a failure cannot infer the emergence of a partition unless they are notified that the destination is unreachable. TDVR works with three local actions that guarantee global convergence: (1) Monitor and update a link table that keeps the costs of local links to neighbors, (2) Recompute DV (to all destinations in the network) as well as the forwarding table by using the Bellman-Ford procedure whenever there is a change in the link table or a DV from a neighbor is received in an update message, and (3) If there was a change in the forwarding table (e.g., a shorter or longer path is calculated for a destination), broadcast the new DV to all neighbors. Three typical optimizations to this procedure are broadcasting the updated part of DV instead of the entire DV, not including the sender of the update message in the DV broadcast and applying poisoned reverse to the DV entries by either removing them from the DV or setting them to infinity. In BSDVR, these optimizations are assumed to be implemented for the remainder of this discussion.

Figure 2:
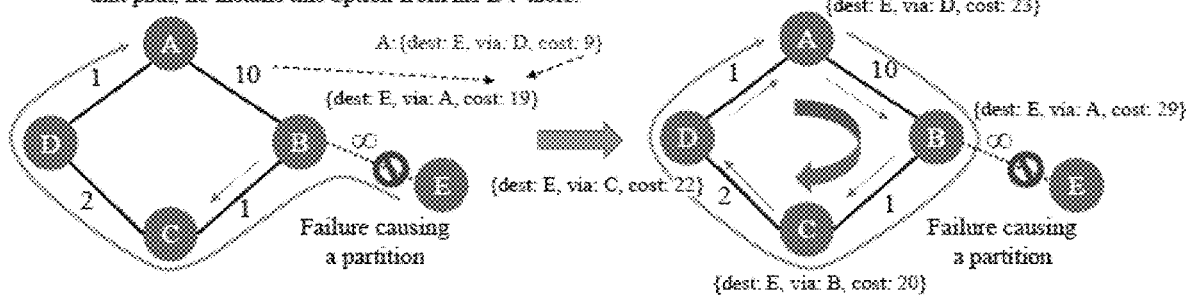
FIG. 2 illustrates an emergence of count-to-infinity in TDVR over a partitioned network, as is known in the art.

Consider the SPF tree for destination E in FIG. 1. In DVR, destination I is reached via the SPF tree where i is the source. The SPF tree for each destination is conceptual and maintained across DVTs of nodes. The forwarding tables in each node only maintain one-hop forwarding decisions of these network-wide trees. The end-to-end shortest paths emerge from concatenation of destination-based forwarding along these trees. When the link B→E fails, the network is partitioned and E is unreachable for the rest of the network, as shown in FIG. 2. Since, prior to the failure, B had learned that A can make him reach E with cost 9, without knowing he is on the upstream of that path, B installs this option from his DVT and sends the "new" (but fake) path to C as an update message. Note that this effectively changes the SPF tree for E such that there is a loop in it, as shown in FIG. 2. Since C has no better option, it installs this new path from B and propagates it to D, which then to A. A further propagates it to B, thereby establishing a count-to-infinity cycle.

The fundamental reason why TDVR cannot avoid count-to-infinity when it faces partition-causing failures is that it does not separate paths to unreachable destinations from the paths to reachable destinations. In the example above, if the nodes below the failure were notified that the failure could potentially be making the destination unreachable, then precautions could be taken.

Figure 3:
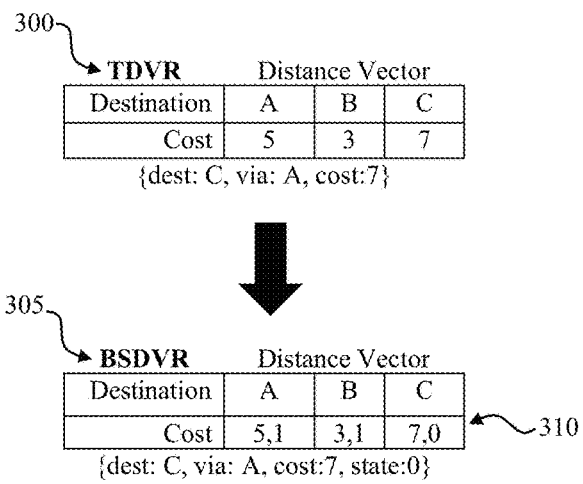
FIG. 3 illustrates a comparison of distance vector (DV) tables for TDVR and the Binary State Distance Vector Routing (BSDVR) method of the present invention.

BSDVR handles the count-to-infinity cycle issue by associating active or inactive state to each DV entry and explicitly marks the paths with reachability information, as shown in FIG. 3. Likewise, the DV updates being sent to the neighbors, which is part of the regular process in TDVR, also include this binary state information. As illustrated in FIG. 3, the DVT for TDVR 300 identifies the cost of the path but does not identify the state of the path. In contract, the DVT for BSDVR 305 identifies both the cost and the state 310 for the paths in the DVT.

Figure 4:
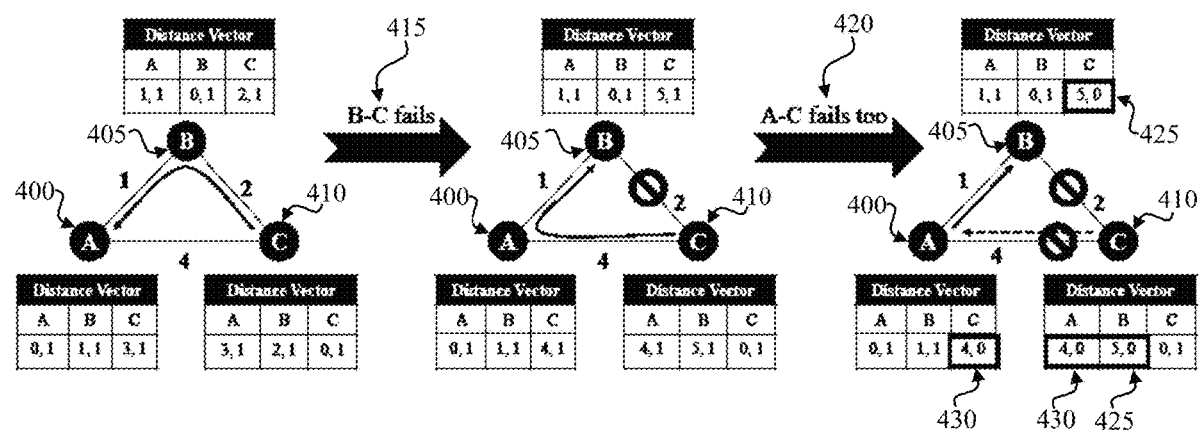
FIG. 4 illustrates the integration of state information into BSDVR, in accordance with an embodiment of the invention.

In the example shown in FIG. 4, the link B→C 415 is disconnected, which causes new active shortest paths to be calculated. This is a failure that TDVR can handle. But, when the link A→C 420 also fails, a partition emerges, and this causes the paths from A 400 and B 405 towards C 410 as well as from C 410 to A 400 and B 405 to become inactive. In BSDVR, these inactive paths are explicitly acknowledged in the state fields of the corresponding DV entries 425, 430.

In routing terminology, the shortest path to a destination is the primary path towards that destination and is typically illustrated as the upstream part of the SPF tree for that destination. This terminology will be used below to discuss how the DV updates with binary state DV entries are used to handle link failures that may be causing partitions and outline how to merge DV entries with different states.

Figure 5:
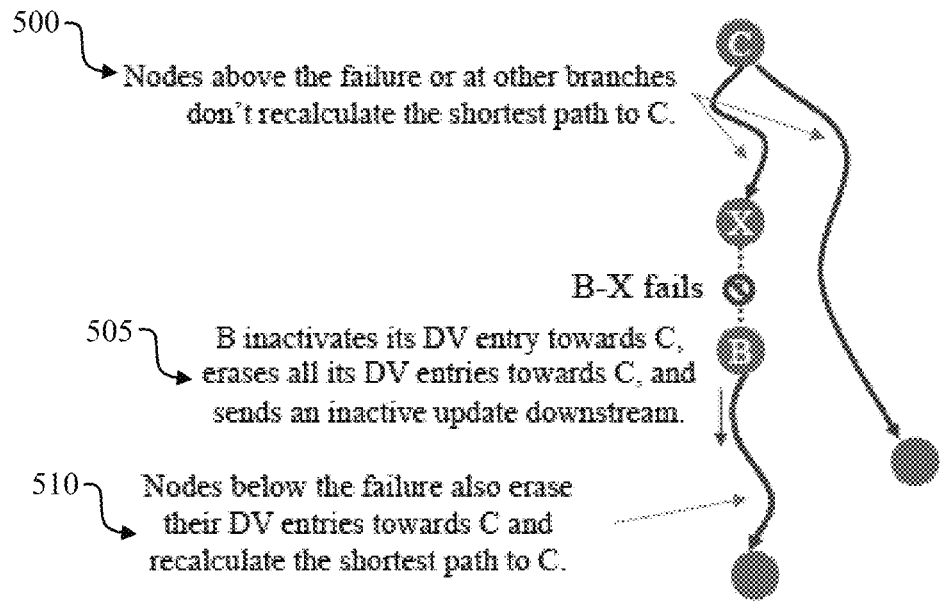
FIG. 5 illustrates a failure of the primary path to a destination resulting in a partitioned network.

To avoid count-to-infinity cycles from partition-causing failures (as in FIG. 2), BSDVR detects failures on primary path (by inspecting binary states of the DV entries) and introduces proactive messages to make sure any alternative active paths are disseminated to the nodes downstream of the failures. A key component that BSDVR introduces is that if nodes realize that their primary path towards a destination has a failure, they erase all the DV entries for this destination and update other neighbors about the change in the path. Since the DV entries are marked with active or inactive states, the nodes can realize the failure on the primary path when they receive an inactive DV update from the next hop towards the destination, which is also the parent on the SPF tree for that destination. As seen in FIG. 5, when a failure on link B→X occurs, at 500 nodes above the failure or at other branches occur don't recalculate the shortest path to C. At 505, the failure will cause all the nodes below the failure (on link B→X) to inactivate their existing path (i.e., mark the DV entry for the destination C as inactive) and erase all the alternative entries in their DV tables for the destination C. At 510, the nodes below the failure also erase their DV entries towards C and recalculate the shortest path to C. This inactivation of the primary path and erasure of alternative DV entries together guarantee that the nodes below the failure will avoid count-to-infinity if destination C has become unreachable for them, i.e., they are disconnected from the rest of the network.

Given that the nodes below the failure on primary path towards the destination are erasing all they know, how do the nodes below failure discover the availability of other paths to the destination via other branches of the SPF tree that are not affected by the failure? A proactive component to TDVR is introduced to solve this issue. In TDVR, a node does not send a DV update message to its neighbors unless there is a change in its forwarding table. BSDVR changes this behavior so that a node replies to an inactive DV update (i.e., an update message that includes an inactive DV entry for a destination) from a neighbor, who is not on the primary path to the destination, by sending its current active DV entry for that destination.

Figure 6:
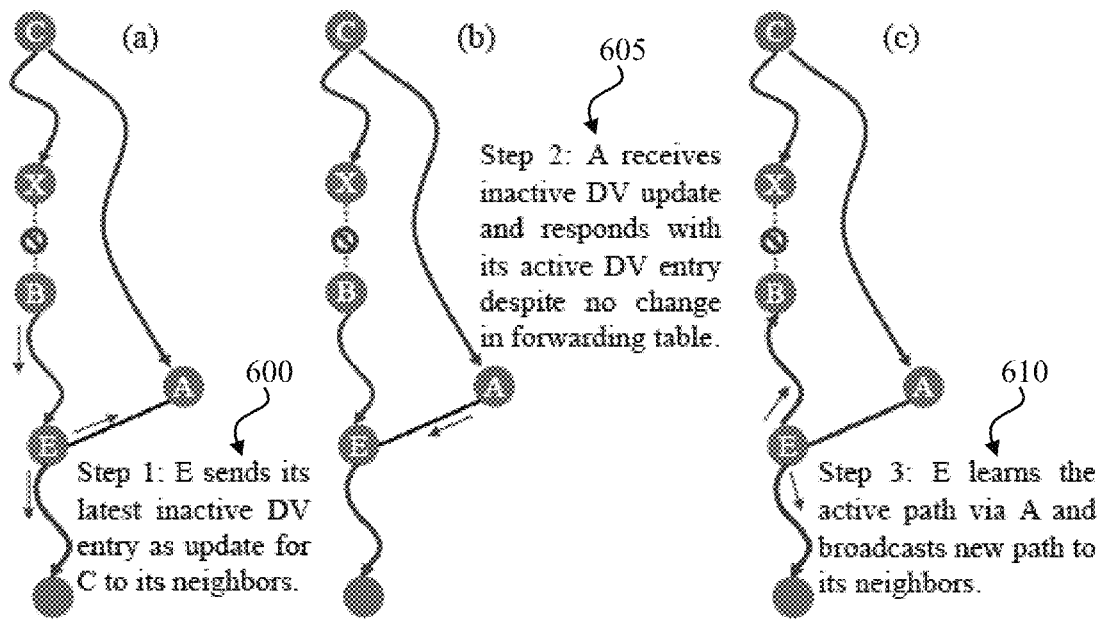
FIG. 6 illustrates a proactive response to inactive DV updates in BSDVR, in accordance with an embodiment of the invention.

In FIG. 6, consider the node E below the failure. At a first step 600, node E will send an inactive DV update to all its neighbors, including A that is residing on another branch of the SPF tree and has an active path to the destination C. At a second step 605, when A receives the inactive update from E, it will prefer its existing path and will not make any changes to its existing DV. So, there will not be any change to the forwarding table of A as a result of the inactive update from E. In TDVR, A should not send any update, as its shortest path has not changed. But, to make sure E is informed about the existence of the alternative path via A, new logic is introduced here as shown in 605 and makes A reply to E with its latest DV which informs E about the alternative path. Finally, at the third step 610, after receiving the update from A, E goes on to update its DV with the active entry and inform its neighbors (that were below the failure) about the path via A.

A careful inspection reveals that BSDVR introduces additional messages when handling a link failure that is not causing a partition. This is due to the fact that the nodes below a failure are forced to erase all the alternative path information while some of those alternative paths may still be valid. In TDVR, since E would not erase its alternative path via A when it received the inactive DV update from its primary path, it would immediately install this alternative path and the nodes below E would not even know about the failure. In BSDVR, however, E is forced to erase what it knows for the possibility that E and its neighbors may be part of a partition caused by the failure. This causes E to send an inactive update to A as well as all the nodes below E. Then, after receiving the availability of an active path via A, E sends another DV update with this alternative active path. This process causes the nodes below E to receive two updates, both of which would be avoided in TDVR when handling the failure. However, it will be shown below that this is a good tradeoff, since BSDVR avoids the huge cost of count-to-infinity in return of small extra overhead during failures not causing a partition.

A major complication, as well as novelty, is how to calculate paths given two types of DV entries. Since there may be multiple paths available for reaching the same destination as active or inactive, there is a need to assign preference between them. Table I summarizes BSDVR's control logic in handling different DV entries when an update message is received.

TABLE I

Merging Current & New DV Entries

| Current | New | Rule |
| --- | --- | --- |
| Active | Active | Choose min-cost DV entry |
| Inactive | Inactive | Choose min-cost DV entry |
| Inactive | Active | Choose the active entry iff its cost is finite |

TABLE I-continued

Merging Current & New DV Entries

| Current | New | Rule |
|---------|-----|------|
| Active | Inactive | IF {cost of the active entry is infinity}<br>  Choose the inactive entry<br>ELSE<br>  IF {the inactive entry is on<br>     primary path}<br>    Choose the inactive entry<br>    Remove alternative DVT entries<br>    (avoids "fake paths")<br>  ELSE<br>    Reply to the inactive update |

If both the incoming and existing DV entries are the same type, BSDVR uses Bellman-Ford's algorithm to calculate minimum cost paths. However, there are two new cases to consider: 1) An active DV entry arrives while there is an inactive entry for the same destination. 2) An inactive DV entry arrives while there is an active entry for the same destination. How BSDVR handles these cases is detailed below by using the following notation based on the scenario in FIG. 7:

C is the destination,
E is the sender of the DV update,
A is the recipient of the inactive DV update,
l is the cost of the link A-E,
$c_1$ is the length of the shortest path A→C, and
$c_2$ is the length of the shortest path E→C.

Figure 7:
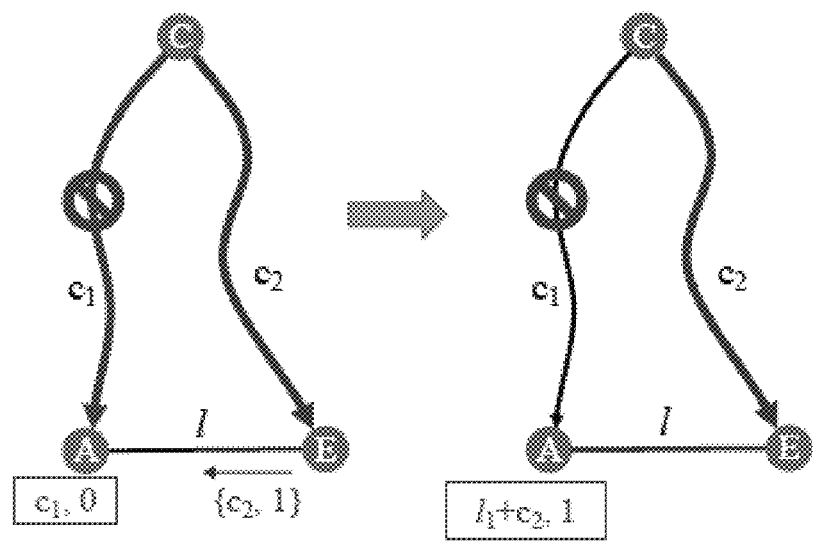
FIG. 7 illustrates active DV updates for inactive DV entries, in accordance with BSDVR of the present invention.
Figure 8:
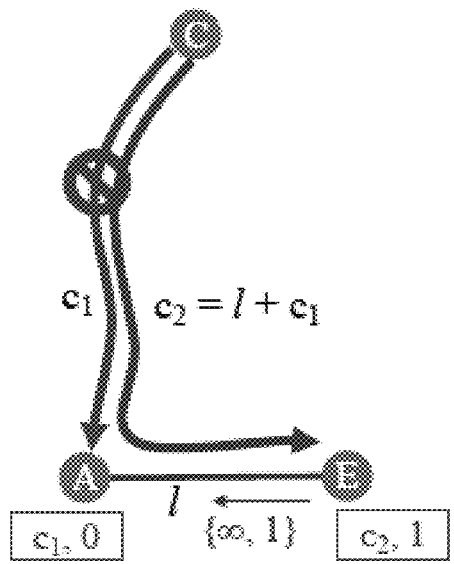
FIG. 8 illustrates a poisoned active DV update.

When an active DV update arrives while current DV entry for the same destination is inactive, BSDVR chooses the new active entry, if the new entry cost is below infinity. This is shown in FIG. 7. E sends an active DV update $\{c_2, 1\}$ informing A about the existence of an active path towards the destination C with a finite distance $c_2$. Since A's existing DV entry $[c_1, 0]$ for destination C is inactive, it is best for A to install the new path with the cost $l_1+c_2$ regardless of how $c_1$ compares to this active path's length. This is simply because of the fact that an active path is reachable while an inactive path is unreachable, and hence an active path is preferable. An exceptional case is that the DV update may be poisoned, which will present an active path with infinite cost as illustrated in FIG. 8. This happens when E has been using A to reach C and A has not informed E about the failure yet. Observing the ∞ cost value in the DV update, A should not accept the active path via E as that would constitute a loop.

Even though it may seem that there should be no action to be taken when an inactive DV update comes for an active DV entry, there are two critical cases for BSDVR to handle: 1) This inactive DV update may be an indication of a failure on the primary path. 2) The inactive update is coming from a neighbor that just inactivated its existing path (due to an inactive update from its primary path) and it needs to be informed about the existence of the alternate active path.

Figure 9:
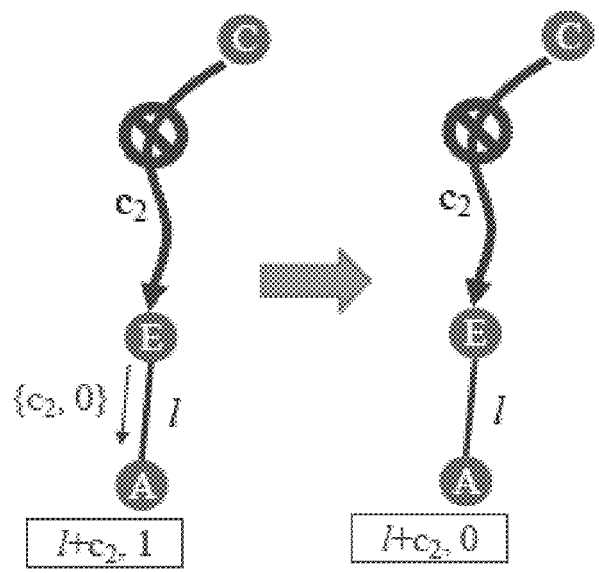
FIG. 9 illustrates an inactive DV update from a parent on the shortest-path first (SPF) tree, in accordance with an embodiment of the invention.

An inactive DV update may come from the parent due to a failure upstream to the parent. In FIG. 9, E inactivated its DV entry for destination C due to a failure on its upstream path towards C and needs to let its neighbors know about this. Thus, it sends an inactive DV update to A. At A, this presents itself as a situation where the parent node on the primary path towards the destination C is reporting that its path to C is now inactive. Since this means that the upstream is now failed, A accepts this update and erases all its alternative DV entries for C and sends an inactive update to its other neighbors. As previously explained, this is an intentional inactivation embedded in the protocol so that all the nodes below a failure are forced to recalculate their paths.

Figure 10:
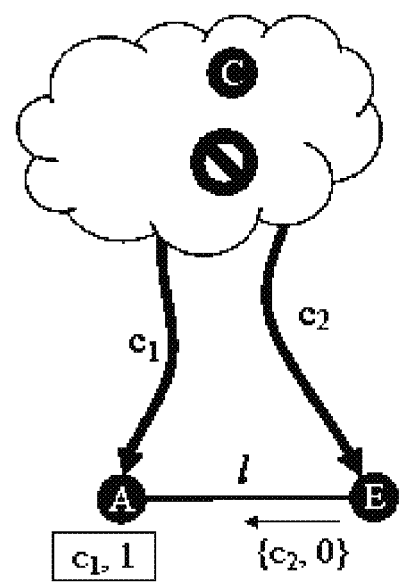
FIG. 10 illustrates an inactive DV update from a non-parent on the SPF tree, in accordance with an embodiment of the invention.
Figure 11:
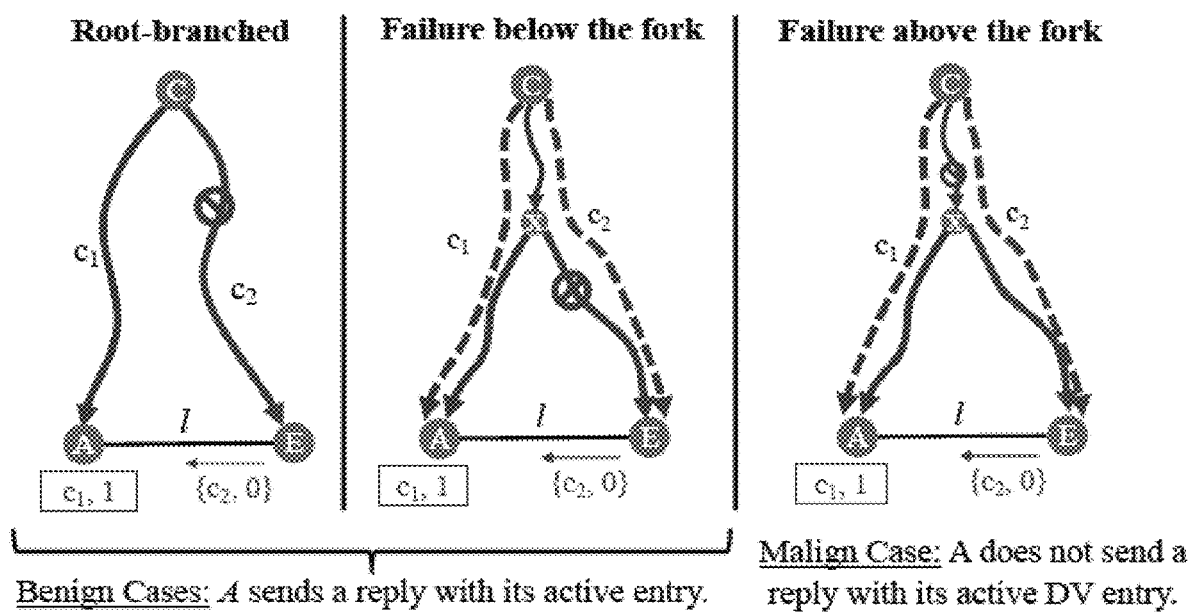
FIG. 11 illustrates an inactive DV update from a non-parent node, in accordance with an embodiment of the invention.

When an inactive update comes from a nonparent neighbor, this means the sender of the update does not know about the existing active path. From A's perspective, E is a neighbor that does not have an active path to C while A itself has one. So, A should proactively inform E about the existence of an active path to C so that E can also utilize this path. However, as illustrated in FIG. 10, the complication here is that the failure that triggered E to send an inactive entry may be upstream to A too. This situation can happen when failure information propagates to E before A. If that is the case, A should not reply and wait until it is sure that its active entry $[c_1, 1]$ is still valid. These possibilities must be differentiated in order for A to decide when to proactively reply by sending an active DV update to E. These possibilities are categorized into three cases as shown in FIG. 11: First, E could be on an entirely different branch from the root of the SPF tree. This case is referred to as the "Root-branched" case, and in this case, A should reply to E with its active DV entry for destination C. It is also possible that the paths from A to C and E to C overlap upstream and there is a fork at a node X. This fork case can be good or bad. If the failure is below the fork node X, then A should reply with its active entry. However, if the failure is above the fork node X, then A should wait until it gets notified that its primary path to C has become inactive. At A, it may be possible to distinguish these cases and identify the benign and malign ones. But, if it is ambiguous, A starts a Pending Reply Timer and waits before sending a reply to E. This timer is relied upon for resolving ambiguous cases of sending proactive replies. In the current version, when it is judged that there is no possibility of a fork node X (which means it has to be a benign case) if (1) A's parent is C or (2) the cost of reaching E from A via A's parent is equal to $c_1+c_2$. Otherwise, A starts the timer due to doubt on the presence of fork node X.

BSDVR is implemented using multiple processes, which emulates a routing environment among mobile devices where processes open or close TCP-like connections with each other using Bluetooth or Wi-Fi interfaces. In an exemplary embodiment, up to 30 nodes placed randomly in a topology with 3 to 5 average node degree were emulated and the Pending Reply Timer of BSDVR was set to 100 ms and compared it against the TDVR in terms of convergence time and messaging overhead. In TDVR, the infinity was represented by the maximum integer value. The experiments were repeated 3 times on different topologies.

Figure 12A:
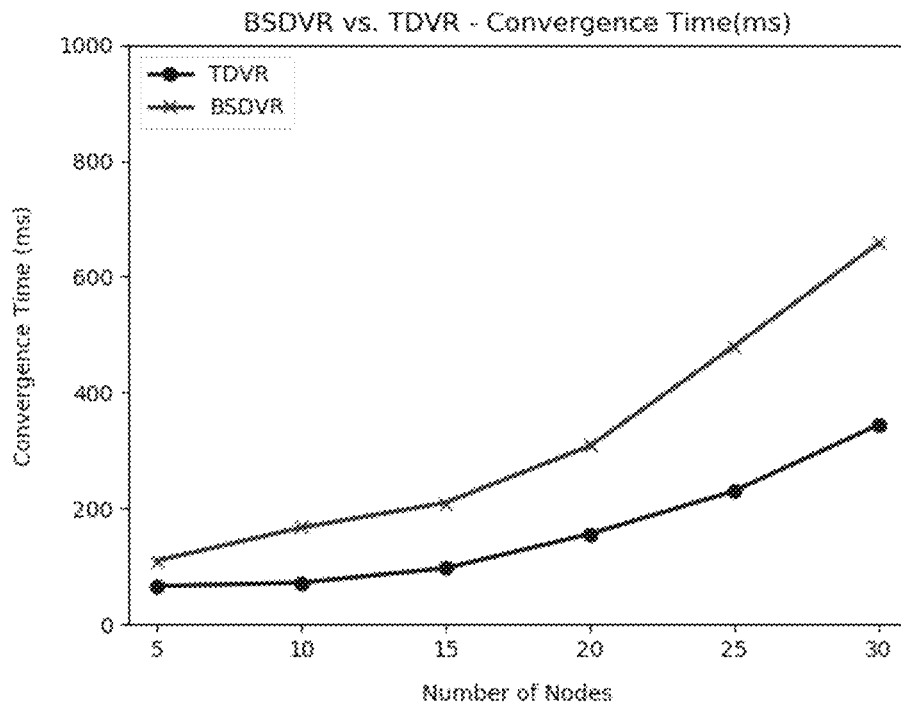
FIG. 12A illustrates convergence time (ms) results from BSDVR experiments with single link failures.
Figure 12B:
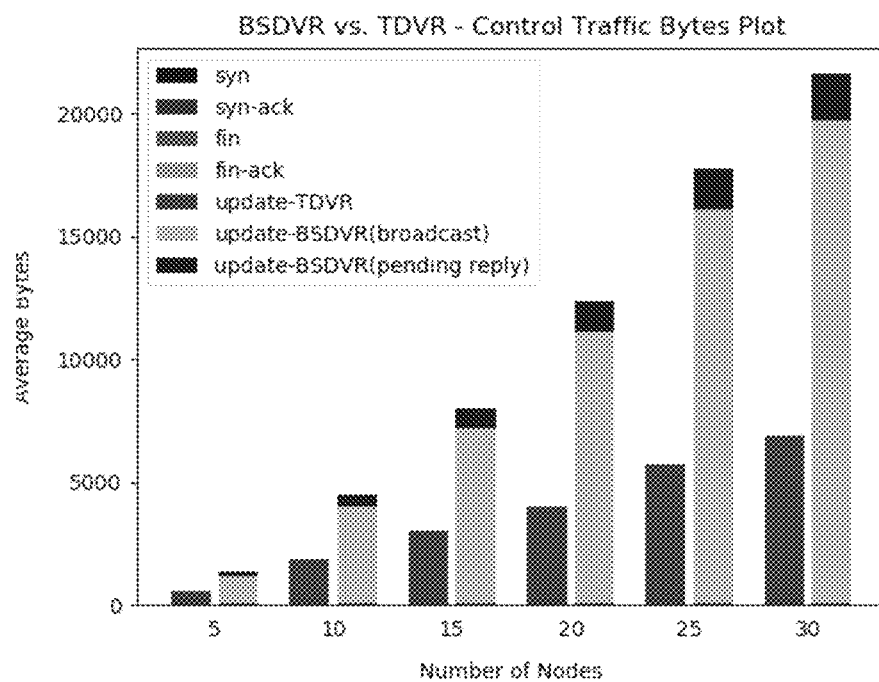
FIG. 12B illustrates control traffic (Bytes) results from BSDVR experiments with single link failures.
Figure 12C:
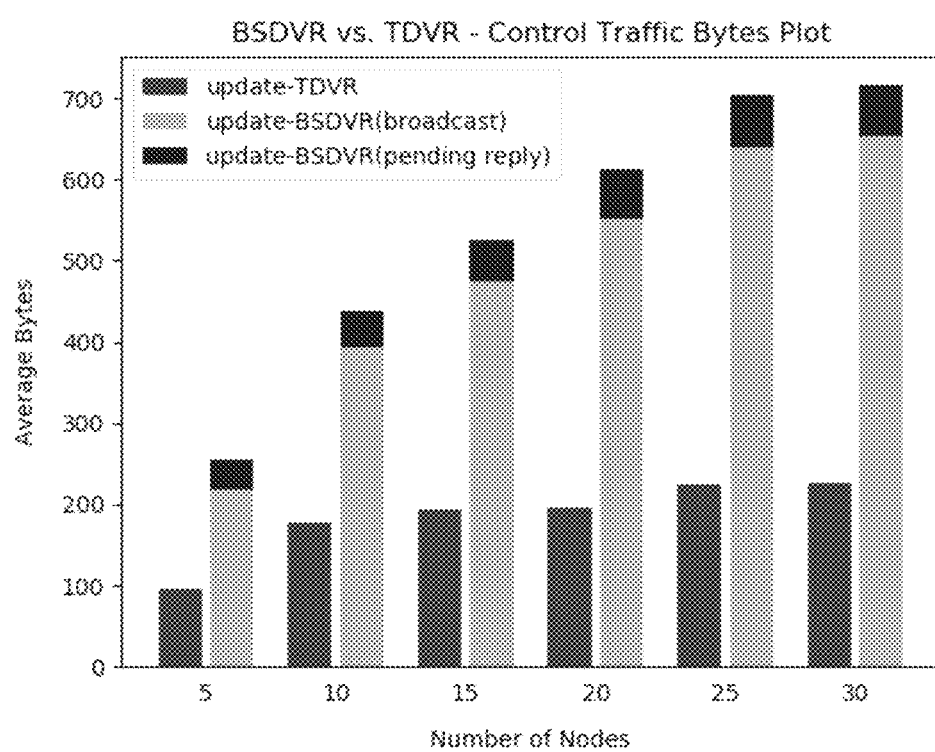
FIG. 12C illustrates control traffic per link (Bytes) results from BSDVR experiments with single link failures.

In one experimental embodiment, the links were failed in the network one by one. Since the topologies had a minimum degree of 2, this meant that there was no partition due to the link failures. In terms of convergence time, it can be observed in FIG. 12A that BSDVR performs worse than TDVR in handling failures that do not cause partitions. This is due to the fact that there is a fixed Pending Reply Timer that sometimes cause the nodes to wait unnecessarily before sending an active path to its neighbor. This is also visible on the control traffic, in FIG. 12B, as BSDVR generates more DV updates. Even though the number of replies is few, unnecessary DV updates cause notable additional control traffic in BSDVR. The good news is that BSDVR's control traffic overhead does saturate with respect to the network's capacity as seen in FIG. 12C. The takeaway is that optimizing the Pending Reply Timer or eliminating the need for the timer is crucial for BSDVR's performance over a non-partitioned network.

Figure 13A:
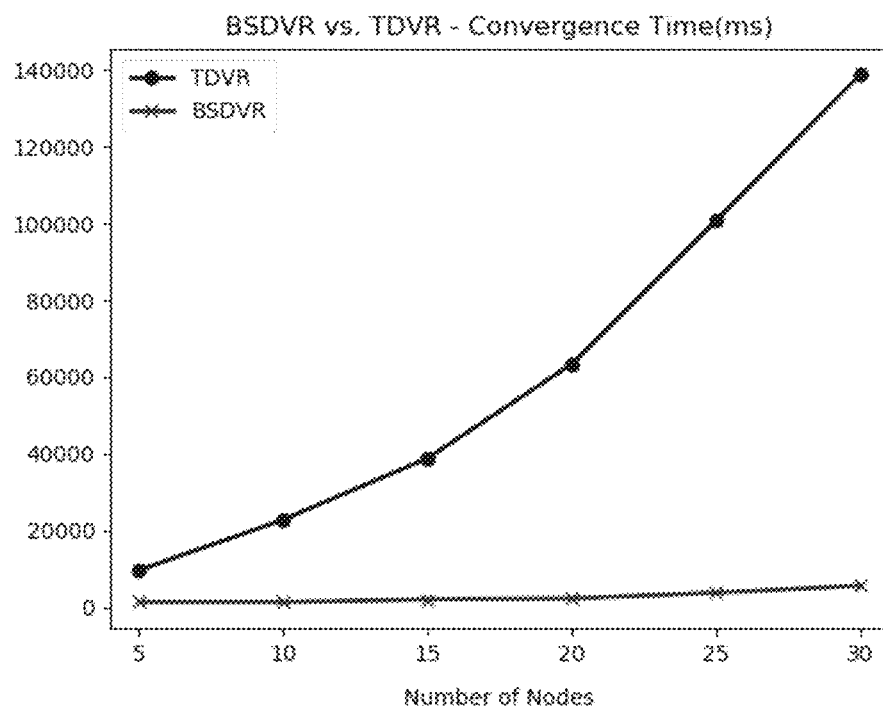
FIG. 13A illustrates convergence time (ms) results from BSDVR experiments with partitions.
Figure 13B:
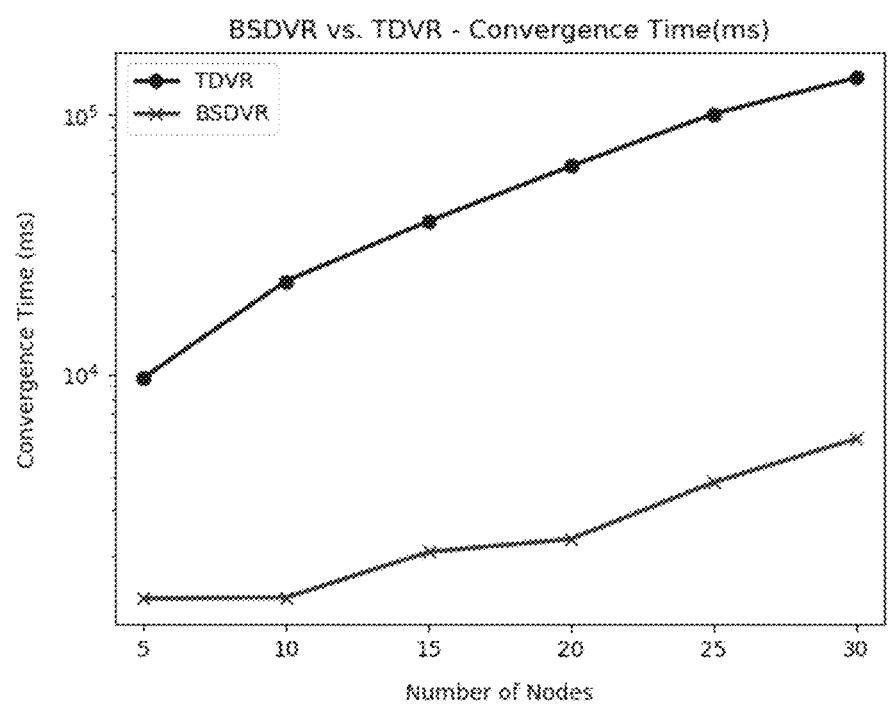
FIG. 13B illustrates convergence time (log ms) results from BSDVR experiments with partitions.
Figure 13C:
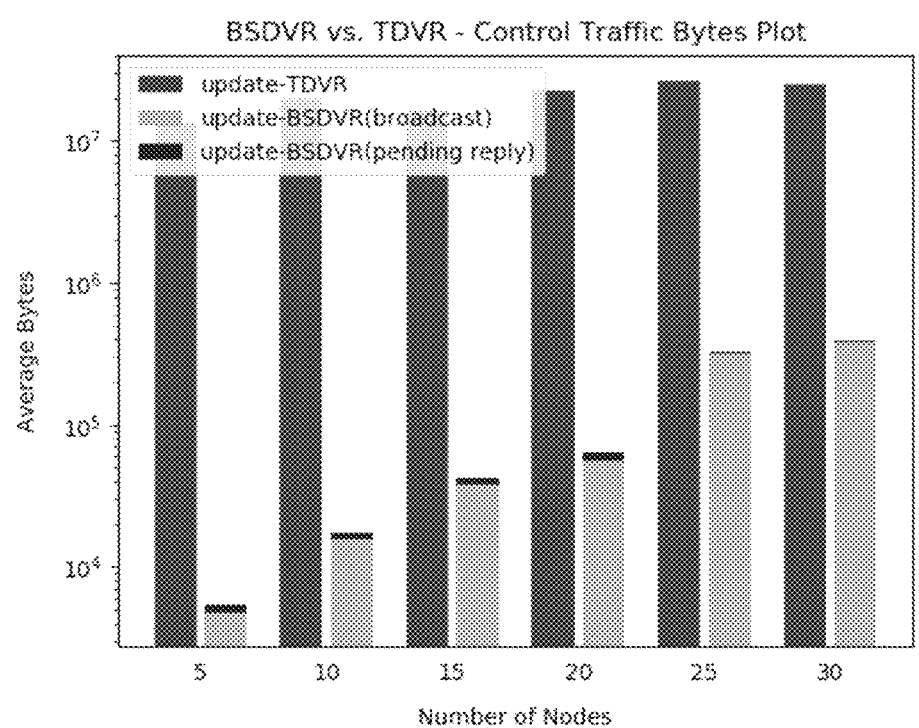
FIG. 13C illustrates control traffic (log Bytes) results from BSDVR experiments with partitions.

The real benefit of BSDVR is in handling the failures that cause partitions. To test this, in the same topologies as before, the links of a node were failed simultaneously and caused a partition in the network. The convergence time and control traffic were then measured in the rest of the network without the disconnected node. This was repeated for every node in the network. As shown in FIG. 13A, TDVR experiences count-to-infinity and takes much longer time to converge, while BSDVR's convergence time is virtually unaffected by the partition in the network. This is clearer in the logarithmic scale plot in FIG. 13B. It can be seen that BSDVR's convergence time increases only linearly as the network grows. In terms of the control traffic, in FIG. 13C, an order of magnitude benefit can be seen for BSDVR as it prevents count-to-infinity during partition-causing failures.

How the active and inactive states are utilized by the data plane of BSDVR in its data dissemination policy to achieve a near unicast forwarding solution is now detailed. Flooding in BSDVR in greatly restricted to make dissemination of data packets nearly unicast by assigning dissemination categories to the packets in the message buffer.

BSDVR involves eventual delivery of messages to known destinations such that every node keeps track of the current underlying topology either fully-connected or partitioned. Even when there are frequent disconnections in the topology due to high node mobility, patterns in that mobility are still captured through the inactive state paths by the control plane and are then utilized by the data plane's dissemination policy. Similar to epidemic routing, every node in BSDVR maintains a message buffer to hold both packets that it wants to send and it wants to relay for another source node. In order to optimize the use of network resources all messages in the buffer have a unique message digest assigned to them, which is a 32-bit number computed by hashing the source and destination addresses of the message with a randomly generated nonce. Furthermore, additional states from the binary state information of paths are assigned to packets in the message buffer. The data packets in the message buffer of can have three possible states: not-forwarded, inactive-forwarded and active-forwarded, as previously described. When two nodes encounter each other in the network they initiate an exchange a summary vector of message digests that are either in the not-forwarded or inactive-forwarded state to determine if they have come across a new message which is either destined to any one of them or it's a message they can relay to its eventual destination. In BSDVR, once a message becomes active forwarded by a node it never gets forwarded again in order to enforce a near unicast forwarding of messages. Finally, if any of the two nodes discover a new message on receiving their respective summary vectors, they can send a response to request a copy of the new message and add it to the message buffer once it is received.

Figure 14:
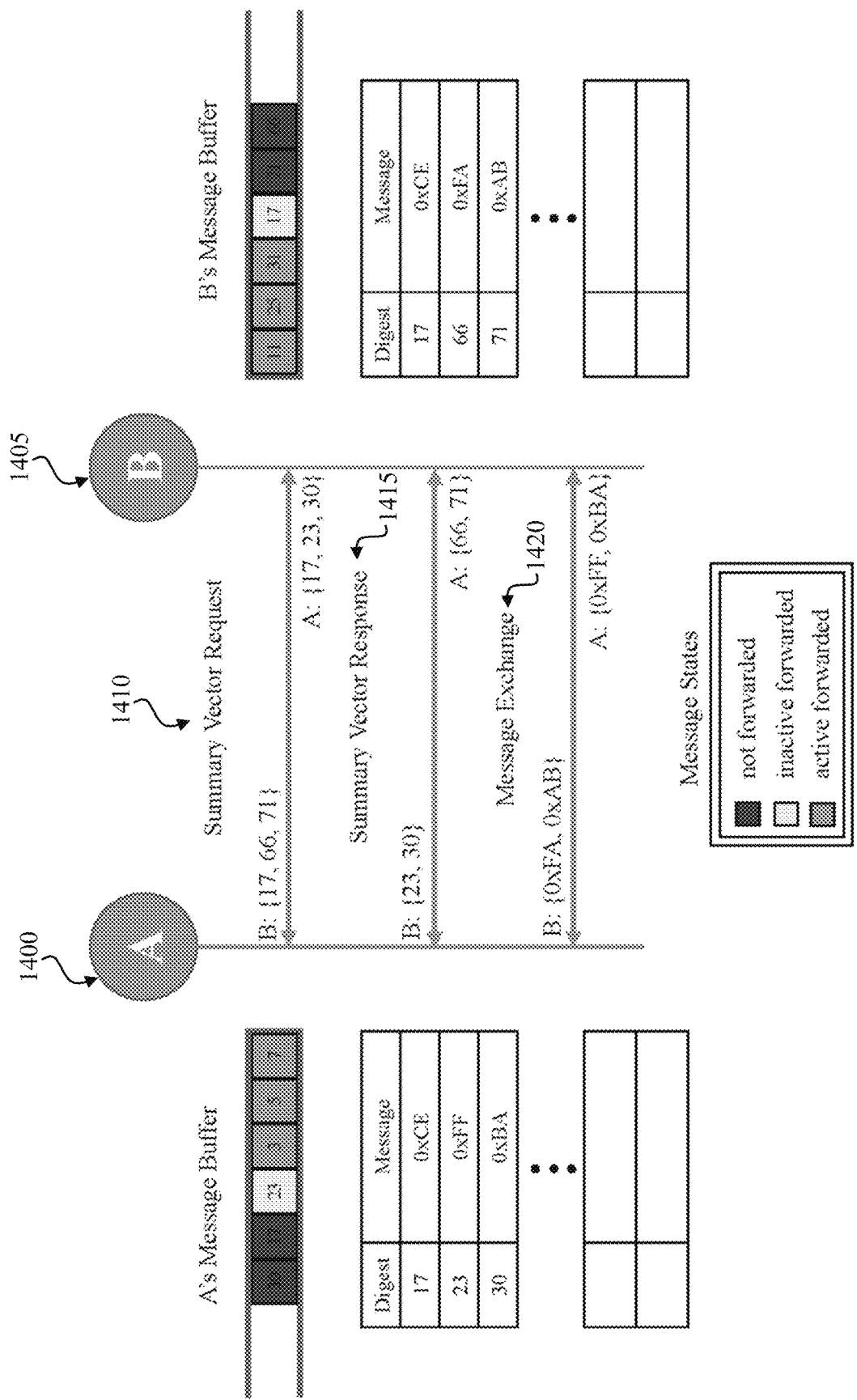
FIG. 14 illustrates message exchange between two nodes in accordance with BSDVR.

An example of the message exchange is illustrated in FIG. 14 where two nodes A 1400 and B 1405 become neighbors. In the initial step 1410 labeled as summary vector request, both nodes 1400, 1405 exchange the digest list of messages currently in their respective message buffers that either have a not forwarded or inactive forwarded state. Node A's 1400 sent summary vector includes the messages 17, 23 and 30 and node B's 1405 contains the messages 17, 66 and 71, respectively. On receiving the initial summary vectors both A 1400 and B 1405 realize they have already received the message with digest 17 and thereby, exclude it from their respective follow-up request of new messages in the next step 1415 labeled as summary vector response. Finally, after receiving the other node's request for the actual message in this step, both A 1400 and B 1405 fetch the actual message payload by their digest mapping from their respective message buffers and exchange the messages in final step 1420 labeled as the message exchange.

In BSDVR routing, every node in the network can assign a maximum message buffer size in order to limit the amount of network resources consumed. Consequently, an eviction policy is required to make space for new messages when the message buffer is full. Eviction policy entails balancing a trade-off between resource utilization and the delivery latency. The simple policy of dropping older messages from the buffer for newer messages is reasonable when the message buffer is large enough to contain the expected number of received messages. However, in a network setting where the message buffer cannot be large enough, the effective message buffer utilization degrades. This simple policy can be improved by adding a mechanism to assign priority to messages to maximize the message buffer utilization along with high message delivery likelihood. BSDVR utilizes the message states of not forwarded, inactive forwarded and active forwarded to operate its message buffer as a priority queue. When the message buffer is full, BSDVR removes older packets in the order of active forwarded, inactive forwarded and not forwarded respectively, where the not forwarded packets are only removed if allowed TTL has expired to maximize the delivery likelihood.

Figure 15:
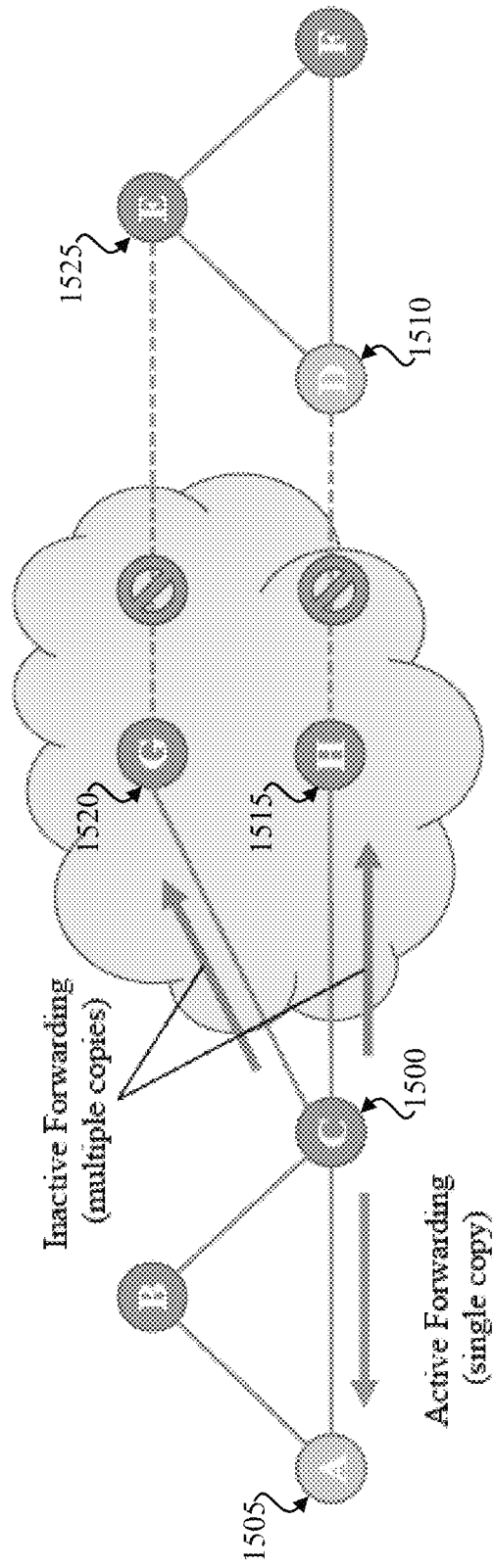
FIG. 15 illustrates active and inactive forwarding between nodes in accordance with BSDVR.

In BSDVR routing, messages in a node's message buffer can be forward either via an active path or inactive path. When messages are inactive-forwarded, they are passed onto a relay node that has an inactive path to the final destination, which implies that the relay node encountered the destination at some point in the past. Inactive forwarding aims to utilize these past encounters by forwarding the message to multiple relay nodes with the aim to capitalize on the existence of a possible mobility pattern that ensures that at least one of these relay nodes will eventually deliver the message when they encounter a path to reach the final destination again sometime in the future. In contrast, when messages are active-forwarded, they are either passed directly to the destination node or to a relay node that currently has an active path to reach the destination. Active forwarding, capitalizes on the underlying connected topology to ensure messages are forwarded along the shortest path to the destination. As the underlying topology is connected, messages are only forwarded once in active forwarding in order to enforce a near unicast forwarding strategy which is a reasonable policy as messages forwarded along active paths have a very high delivery likelihood. An example of both types of forwarding strategies is illustrated in FIG. 15, where a source node C 1500 wants to deliver messages to destinations A 1505 and D 1510. Node C 1500 realizes in the current network setting it has an active path available for reaching node A 1505, so it only has to forward the message destined for A 1505 once via the shortest path, which in this example is the path C→A. For the case of destination D 1510, node C 1500, currently has two inactive paths for H→D and G→E→D via nodes G 1520, E 1525 and H 1515. As the message delivery likelihood on inactive paths is lower than an active path, C 1500 forwards the message destined to D 1510 along both inactive paths to relay nodes G 1520 and H 1515 to maximize its delivery likelihood.

BSDVR was implemented as a module of the well-known network simulator NS-3, to simulate the operations of the protocol in a regular mobile network setting example provided by the simulator. Packet simulations for up to 100 nodes using Wi-Fi links and were obtainable and the results were compared the results against two well-known ad-hoc routing protocols, AODV and OLSR. The performance of BSDVR was evaluated against these two protocols in terms of the average control message overhead, the average end-to-end delay in delivery of packets and the average lost packets per flow during delivery while varying the network density. The complete configuration details of the simulation experiments are summarized in Table II.

TABLE II

Simulation Configuration

| Parameter | Configuration |
| --- | --- |
| Number of Nodes | [25, 50, 75, 100] |
| Map Size | 300 m × 1500 m |
| Mobility Model | Random Waypoint |
| Speed | 20 m/s |
| Simulation Time | 200 s |
| Connection Rate | 4 pkts/sec |
| Packet Size | 64 bytes |
| Buffer Size | 64 pkts |

Figure 16A:
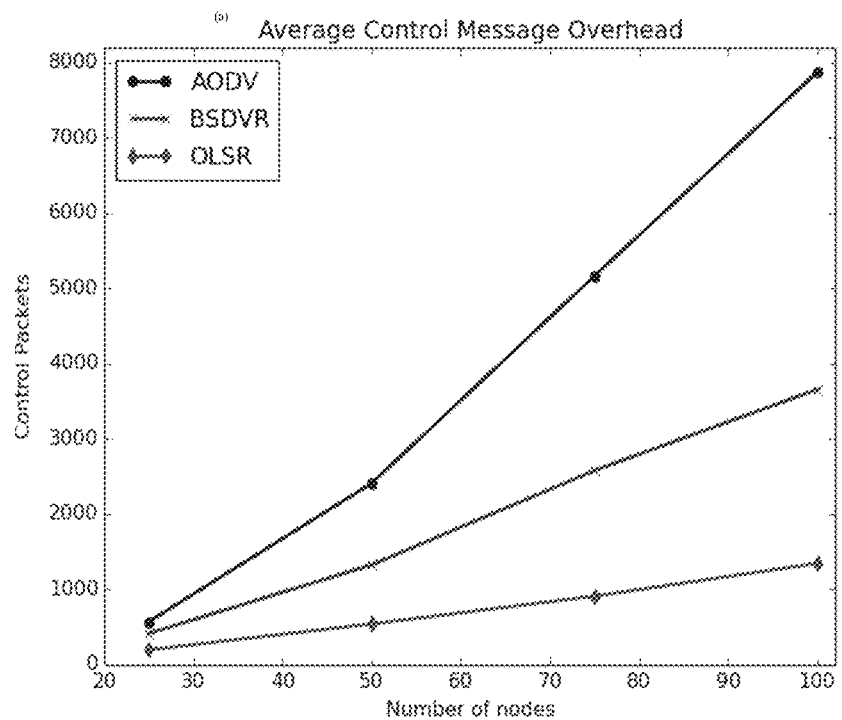
FIG. 16A illustrates average control message overhead results from BSDVR experiments for various simulations.
Figure 16B:
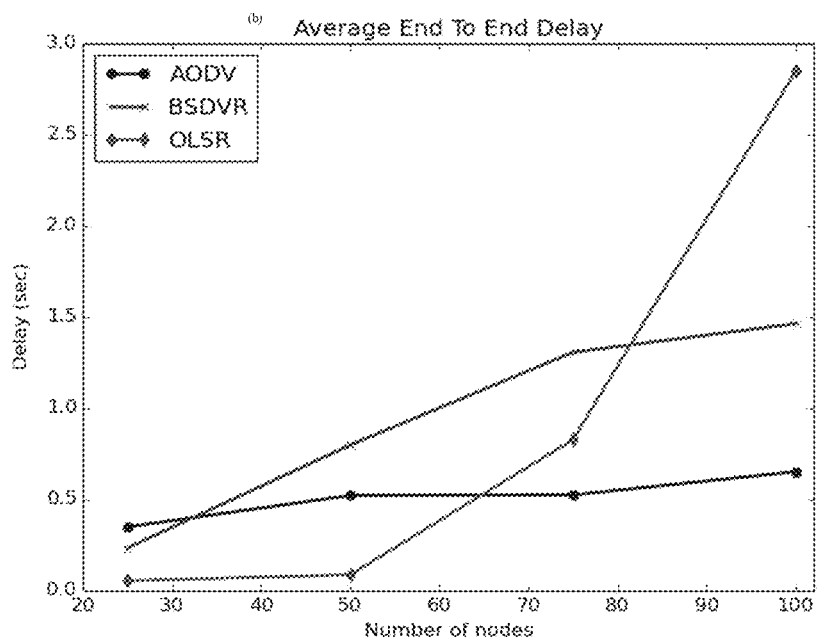
FIG. 16B illustrates average end to end delay results from BSDVR experiments for various simulations.
Figure 16C:
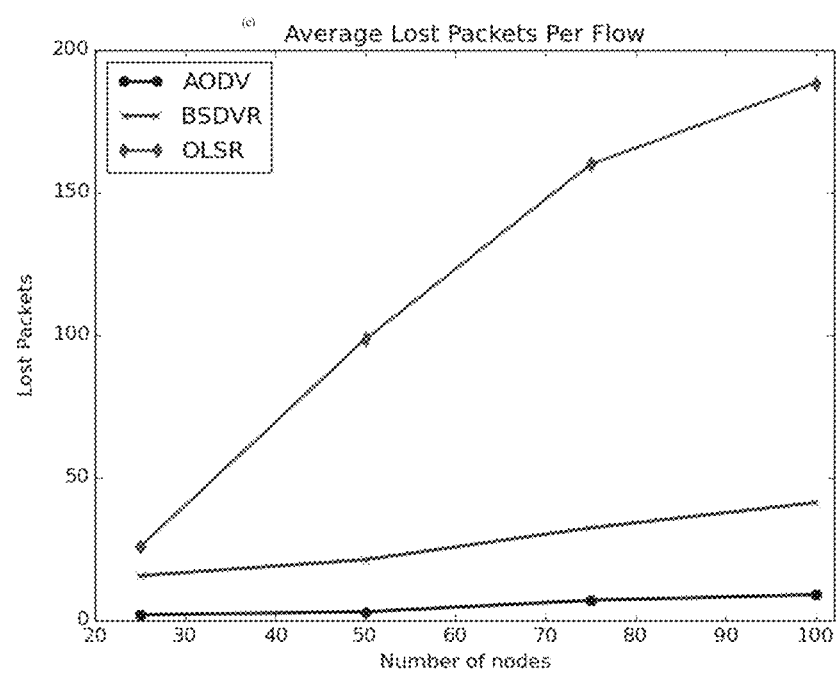
FIG. 16C illustrates average lost packets per flow results from BSDVR experiments for various simulations.

The average control message overhead in FIG. 16A shows that all three protocols have a nearly linear growth in control message overhead as the network density increases. AODV experiences larger growth than both BSDVR and OLSR as its route discovery operation is much more expensive than OLSR's periodic exchange of complete routing state information and BSDVR's reactive exchange of only its updated routing state information. Similarly, BSDVR has a higher growth in comparison to OLSR, due to its operation of removal and delayed re-transmission of valid routing state information, which is done for avoidance of routing loops, alongside its regular reactive exchange of only the updated routing state information. The average end-to-end delay in delivery of data packets, presented in FIG. 16B, shows that AODV and BSDVR see a somewhat linear increase in their respective delays while OLSR experiences an exponential increase. AODV is able to achieve low end-to-end delays, as its data transmission is only performed along active and complete unicast forwarding routes. OLSR, on the other hand, makes use of a controlled flooding strategy that involves election of a multi-point relay node from its group of neighbors to limit its flooding, which increases the latency exponentially as the network density increases. In contrast, BSDVR utilizes complete and partial forwarding routes for both unicast and multicast forwarding strategies. Although, this allows BSDVR to obtain an overall nearly linear growth like AODV, the delays experienced are larger due to the use of partial forwarding routes. The average lost packets per flow during delivery illustrated in FIG. 16C, shows that all three protocols see a near linear increase in the packets dropped, which is attributed to keeping the data packet buffer constant while the overall transmission traffic increases, as the network density is increased. AODV achieves the very low loss of packets per transmission flow as it utilizes complete routes throughout each of the intermediate flows in the end-to-end transmissions. Conversely, OLSR experiences much larger loss in packets per transmission flow, as it operates on a flooding strategy where a great amount of packets are dropped during the intermediate flows as the subset of relay nodes carrying those packets do not encounter a complete route to the final destination. Finally, for the case of BSDVR, the protocol utilizes both complete and partial forwarding routes with a mix of unicast and multicast forwarding strategies. It experiences a higher loss in packets per transmission flow than AODV due to the partial routes in the intermediate transmission flows. However, the use of complete routes in the intermediate transmission flows, allows BSDVR to greatly reduce its loss in packets per flow in comparison to OLSR. The takeaway from the simulation experiments is that even in a highly mobile network setting, BSDVR operates with control message overheads, end-to-end delays in delivery of packets, and loss in packets per transmission flow indicating performance either nearly on-par or much better than other well-known state-of-the-art routing protocols. Further optimizations in the protocol implementation are likely to improve its performance even more.

BSDVR's key goal is to achieve unicast-like routing that can work on DTNs where partitions are prevalent and link capacities are too limited for carrying multiple copies of data messages. When BSDVR is compared against the traditional DV routing protocol in a controlled network, the emulation experiments showed that BSDVR generates more control overhead during link failures that do not cause partitions; however, this control overhead saturates with respect to the network's capacity. In terms of failures causing network partitions, BSDVR control overhead has an order of magnitude benefit over traditional DV routing, leading to significantly better convergence times.

BSDVR can be used for both wireline and wireless network routing protocols. It will be particularly useful for networks where partitions are known to occur. For large wireline networks with hundreds or thousands of routers, multiple (simultaneous) link failures are common. BSDVR provides the ability to recalculate shortest-paths without causing significant control messaging overhead. For wireless networks with mobile or sparse set of nodes (particularly when cellular infrastructure is not fully available), BSDVR will be able to calculate shortest-paths over disconnected partitions and attain delayed delivery of data packets when the partitions become connected. While a large amount of routing literature exists on how to handle routing in such delay-tolerant networking scenarios, BSDVR offers a novel solution for effective routing in these scenarios.

Various embodiments of the present invention may be embodied on a computer readable medium. Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for disconnection tolerant routing in a network, the method comprising:
   establishing a network comprising a plurality of nodes, wherein each of the plurality of nodes comprises a distance vector (DV) routing table comprising a plurality of DV entries and wherein each one of the plurality of DV entries indicates the primary path toward a destination node and wherein the primary path being the shortest routing path to the destination node;
   assigning binary state information to each of the plurality of distance vector (DV) entries, wherein the binary state information indicates an active state or an inactive state of a routing path to the destination node associated with the respective DV entry, wherein an active state of the DV entry indicates that the destination node is reachable from the node and wherein an inactive state of the DV entry indicates that the destination node is not reachable from the node;
   when one of the nodes of the plurality of nodes realizes that the primary path toward the destination node has experienced a failure and has become unreachable, erasing the DV entries for the primary path and any alternative paths in the DV routing table of the node for the destination node that has experienced the failure and sending an inactive DV update to neighboring nodes in the network that are not on the primary path to the destination node; and
   each of the neighboring nodes in the network replying to the inactive DV update by sending its active DV entry for the destination node that has experienced the failure to its neighboring nodes.

2. The method of claim 1, wherein each of the plurality of DV entries identifies the routing path from the respective node within the plurality of nodes to the destination node and a cost associated with the routing path.

3. The method of claim 2, further comprising, when a new active DV entry is received at one of the plurality of nodes having a current inactive DV entry for the same destination node, selecting the new active DV entry if the cost associated with the routing path is below infinity.

4. The method of claim 2, further comprising, when a new inactive DV entry is received at one of the plurality of nodes having a current active DV entry for the same destination node:
   when the cost of the routing path for the current active DV entry is infinity, select the new inactive DV entry;
   when the cost of the routing path for the current active DV entry is not infinity and the new inactive DV entry is on the primary path, select the new inactive entry and erase DV alternative DV entries; and
   when the cost of the routing path for the current active DV entry is not infinity and the new inactive DV entry is not on the primary path, select the new inactive DV entry.

5. The method of claim 1, wherein each of the plurality of nodes comprises a message buffer for storing one or more data packets and wherein each of the one or more data packets is assigned a state selected from not-forwarded, inactive-forwarded and active-forwarded.

6. The method of claim 5, wherein the not-forwarded state identifies data packets that have not yet been forwarded to any of the other nodes of the network.

7. The method of claim 5, wherein the inactive-forwarded state identifies data packets that have been forwarded to a node wherein the path to the destination node is inactive.

8. The method of claim 5, wherein the active-forwarded state identifies data packets that have been forwarded to the destination node for the data packets.

9. The method of claim 5, wherein, when the message buffer is full, removing data packets from the message buffer in the order of active-forwarded, inactive-forwarded and not-forwarded.

10. The method of claim 1, further comprising, after receiving the inactive DV update, waiting for an expiration of a pending reply timer prior to sending its active DV entry for the destination node that has experienced the failure to its neighboring nodes.

11. A system for performing disconnection tolerant routing, the system comprising:
    a plurality of nodes connected in a network, wherein each of the plurality of nodes comprises a distance vector (DV) routing table comprising a plurality of DV entries, and wherein each one of the plurality of DV entries indicates the primary path toward a destination node and wherein the primary path being the shortest routing path to the destination node and wherein binary state information is assigned to each of the plurality of DV entries and wherein the binary state information indicates an active state or inactive state of a routing path to the destination node associated with the respective DV entry, wherein an active state of the DV entry indicates that the destination node is reachable from the node and wherein an inactive state of the DV entry indicates that the destination node is not reachable from the node;
    each of the plurality of nodes configured to:
      realize when the primary path toward the destination node has experienced a failure and has become unreachable, erase the DV entries for the primary path and any alternative paths in the DV routing table of the node for the destination node that has experienced the failure and send an inactive DV update to neighboring nodes in the network that are not on the primary path to the destination node; and when the inactive DV update is received, reply to the inactive DV update by sending its active DV entry for the destination node that has experienced the failure to its neighboring nodes.

12. The system of claim 11, wherein each of the plurality of DV entries identifies the routing path from the respective node within the plurality of nodes to the destination node and a cost associated with the routing path.

13. The system of claim 12, further comprising, when a new active DV entry is received at one of the plurality of nodes having a current inactive DV entry for the same destination node, the node to select the new active DV entry if the cost associated with the routing path is below infinity.

14. The system of claim 12, further comprising, when a new inactive DV entry is received at one of the plurality of nodes having a current active DV entry for the same destination node:

when the cost of the routing path for the current active DV entry is infinity, the node to select the new inactive DV entry;

when the cost of the routing path for the current active DV entry is not infinity and the new inactive DV entry is on the primary path, the node to select the new inactive entry and erase DV alternative DV entries; and when the cost of the routing path for the current active DV entry is not infinity and the new inactive DV entry is not on the primary path, the node to select the new inactive DV entry.

15. The system of claim 11, wherein each of the plurality of nodes comprises a message buffer for storing one or more data packets and wherein each of the one or more data packets is assigned a state selected from not-forwarded, inactive-forwarded and active-forwarded.

16. The system of claim 15, wherein the not-forwarded state identifies data packets that have not yet been forwarded to any of the other nodes of the network.

17. The system of claim 15, wherein the inactive-forwarded state identifies data packets that have been forwarded to a node wherein the path to the destination node is inactive.

18. The system of claim 15, wherein the active-forwarded state identifies data packets that have been forwarded to the destination node for the data packets.

19. The system of claim 15, wherein, when the message buffer is full, the node to remove data packets from the message buffer in the order of active-forwarded, inactive-forwarded and not-forwarded.

20. The system of claim 11, further comprising, after receiving the inactive DV update, waiting for an expiration of a pending reply timer prior to sending its active DV entry for the destination node that has experienced the failure to its neighboring nodes.

* * * * *